(12) United States Patent
Tabassi et al.

(10) Patent No.: US 7,559,760 B2
(45) Date of Patent: Jul. 14, 2009

(54) MODULAR INJECTION NOZZLE HAVING A THERMAL BARRIER

(75) Inventors: Payman Tabassi, Rockwood (CA); Hans Hagelstein, Bischweier (DE); Andreas Schrom, Forbach/Bermersbach (DE)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 778 days.

(21) Appl. No.: 11/100,457

(22) Filed: Apr. 7, 2005

(65) Prior Publication Data

US 2005/0225000 A1 Oct. 13, 2005

Related U.S. Application Data

(60) Provisional application No. 60/600,388, filed on Aug. 11, 2004, provisional application No. 60/559,976, filed on Apr. 7, 2004.

(51) Int. Cl.
B29C 45/20 (2006.01)
(52) U.S. Cl. .................................. 425/549; 425/564
(58) Field of Classification Search .............. 425/549, 425/562, 563, 564, 565, 566
See application file for complete search history.

(56) References Cited

U.S. PATENT DOCUMENTS

| | | | |
|---|---|---|---|
| 3,677,682 A | 7/1972 | Putkowski | |
| 3,812,323 A | 5/1974 | Pink | |
| 3,843,295 A | 10/1974 | Greenberg et al. | |
| 4,230,934 A | 10/1980 | ter Beek et al. | |
| 4,344,750 A | 8/1982 | Gellert | |
| 4,370,115 A | 1/1983 | Miura | |
| 4,517,453 A | 5/1985 | Tsutsumi | |
| 4,557,685 A | 12/1985 | Gellert | |
| 4,576,567 A | 3/1986 | Gellert | |
| 4,662,837 A | 5/1987 | Anderson | |
| 4,678,426 A | 7/1987 | Stauber | |
| 4,795,338 A | 1/1989 | Gellert | |
| 4,818,217 A | 4/1989 | Schmidt et al. | |
| 4,836,766 A | 6/1989 | Gellert | |
| 4,875,845 A | 10/1989 | Hara et al. | |
| 4,875,848 A | 10/1989 | Gellert | |

(Continued)

FOREIGN PATENT DOCUMENTS

AU 452137 3/1973

(Continued)

OTHER PUBLICATIONS

European Standard Search Report for CA application CA 2482254 dated Jan. 1, 2005.

(Continued)

*Primary Examiner*—Tim Heitbrink
(74) *Attorney, Agent, or Firm*—Medler Ferro PLLC (57) ABSTRACT

An injection molding apparatus having a nozzle which includes a first nozzle body segment, a second nozzle body segment, and a thermal barrier coupled between the nozzle body segments. The first nozzle body segment, the thermal barrier, and the second nozzle body segment define a melt channel through the nozzle for delivering a melt stream from a manifold channel of a manifold to a mold cavity. The thermal barrier substantially limits the heat flow from one nozzle body segment to the other, to thereby control the heat distribution along the melt channel.

43 Claims, 5 Drawing Sheets

U.S. PATENT DOCUMENTS

| | | | |
|---|---|---|---|
| 4,892,474 A | 1/1990 | Gellert | |
| 4,899,288 A | 2/1990 | Tsutsumi | |
| 4,902,218 A | 2/1990 | Leonard et al. | |
| 4,945,630 A | 8/1990 | Gellert | |
| 4,981,431 A | 1/1991 | Schmidt | |
| 5,028,227 A | 7/1991 | Gellert et al. | |
| 5,046,942 A | 9/1991 | Gellert | |
| 5,051,086 A | 9/1991 | Gellert | |
| 5,061,174 A | 10/1991 | Gellert | |
| 5,125,827 A | 6/1992 | Gellert | |
| 5,135,377 A | 8/1992 | Gellert | |
| 5,225,211 A | 7/1993 | Imaida et al. | |
| 5,232,710 A | 8/1993 | Miyazawa et al. | |
| 5,268,184 A | 12/1993 | Gellert | |
| 5,299,928 A | 4/1994 | Gellert | |
| 5,316,468 A | 5/1994 | Günther | |
| 5,320,513 A | 6/1994 | Schmidt | |
| 5,421,716 A | 6/1995 | Gellert | |
| 5,494,433 A | 2/1996 | Gellert | |
| 5,507,637 A | 4/1996 | Schad et al. | |
| 5,518,389 A | 5/1996 | Nonomura et al. | |
| 5,591,465 A | 1/1997 | Babin | |
| 5,609,893 A | 3/1997 | Eastwood | |
| 5,820,803 A | 10/1998 | Hashimoto | |
| 5,820,899 A | 10/1998 | Gellert | |
| 5,871,786 A | 2/1999 | Hume et al. | |
| 5,879,727 A | 3/1999 | Puri | |
| 5,894,025 A | 4/1999 | Lee et al. | |
| 5,952,016 A | 9/1999 | Gellert | |
| 6,095,790 A | 8/2000 | Gellert et al. | |
| 6,230,384 B1 | 5/2001 | Gellert et al. | |
| 6,261,083 B1 | 7/2001 | Stern | |
| 6,305,923 B1 | 10/2001 | Godwin et al. | |
| 6,447,283 B1 | 9/2002 | Gellert | |
| 6,666,675 B2 | 12/2003 | Ihara et al. | |
| 6,712,597 B1 | 3/2004 | Van Boekel | |
| 6,789,745 B1 | 9/2004 | Babin et al. | |
| 6,921,257 B2 | 7/2005 | Olaru | |
| 7,137,806 B2 | 11/2006 | Babin et al. | |
| 7,160,100 B2 | 1/2007 | Hagelstein et al. | |
| 7,179,081 B2 | 2/2007 | Sicilia et al. | |
| 7,306,454 B2 | 12/2007 | Babin et al. | |
| 7,462,030 B2 | 12/2008 | Fischer et al. | |
| 2004/0005380 A1 | 1/2004 | Babin et al. | |
| 2004/0071814 A1* | 4/2004 | Babin et al. | 425/549 |
| 2004/0101589 A1 | 5/2004 | Babin | |
| 2004/0166194 A1 | 8/2004 | Trudeau | |
| 2004/0197437 A1 | 10/2004 | Olaru | |
| 2005/0019444 A1 | 1/2005 | Sicilia et al. | |
| 2005/0100625 A1 | 5/2005 | Tooman et al. | |
| 2005/0147713 A1 | 7/2005 | Hagelstein et al. | |
| 2005/0226956 A1 | 10/2005 | Fischer et al. | |

FOREIGN PATENT DOCUMENTS

| | | |
|---|---|---|
| DE | 86 18 162 | 10/1986 |
| DE | 86 20 956 | 1/1987 |
| DE | 40 05 437 A1 | 8/1991 |
| DE | 40 05 437 C2 | 8/1991 |
| DE | 43 12 153 A1 | 12/1994 |
| DE | 43 24 027 A1 | 1/1995 |
| DE | 44 04 894 C1 | 1/1995 |
| DE | 103 33 206 A1 | 4/2004 |
| EP | 0 438 739 A1 | 7/1991 |
| EP | 0 438 739 B1 | 7/1991 |
| EP | 0 443 203 A2 | 8/1991 |
| EP | 0 443 203 A3 | 8/1991 |
| EP | 0 443 203 B1 | 8/1991 |
| EP | 0 583 601 A1 | 2/1994 |
| EP | 0 835 176 B1 | 1/1997 |
| EP | 0 995 574 A1 | 4/2000 |
| EP | 0 995 574 B1 | 4/2000 |
| EP | 1 148 985 B1 | 10/2001 |
| EP | 1 466 715 A1 | 10/2004 |
| FR | 2 641 227 A1 | 7/1990 |
| JP | 60-110416 | 6/1985 |
| JP | 63-202418 A | 8/1988 |
| JP | 2-112919 | 4/1990 |
| JP | 11-58448 | 6/1991 |
| JP | 9-123222 | 5/1997 |
| JP | 2002-331552 | 11/2002 |
| JP | 2003-276057 | 10/2003 |
| JP | 2005-132026 | 5/2005 |
| KR | 10-2006-0032979 | 4/2006 |
| WO | WO 95/05930 | 3/1995 |
| WO | WO 00/46008 | 8/2000 |
| WO | WO 01/15884 A2 | 3/2001 |
| WO | WO 01/15884 A3 | 3/2001 |
| WO | WO 03/080315 A1 | 10/2003 |

OTHER PUBLICATIONS

Ewikon brochure, HPS III-NV Valve Gate Systems, Jun. 2003.
Ewikon brochure, Außenbeheizte Heißkanaldüse, 230 V, für schnelle Farbwechsel, Oct. 2000 (with translation).
International Search Report for PCT/CA2005/000502, mailed Jul. 20, 2005.
"Automotive Hotrunners", *Mold Hot Runners Solutions, Inc. Product Information* Jul. 2002.
*PSG Brochure* Date Unknown.

* cited by examiner

MODULAR INJECTION NOZZLE HAVING A THERMAL BARRIER

CROSS-REFERENCE TO RELATED APPLICATIONS

This application claims the benefit of U.S. provisional patent applications 60/559,976, filed Apr. 7, 2004, and 60/600,388, filed Aug. 11, 2004, which are hereby incorporated by reference in their entirety herein.

BACKGROUND OF THE INVENTION

1. Field of the Invention

The present invention relates generally to an injection molding apparatus, and in particular to an injection molding apparatus having a nozzle with a controlled heat distribution along the nozzle channel.

2. Background of the Invention

Hot runner nozzles often have an uneven distribution of heat along the length of the melt channel when operating in an injection molding apparatus. The nozzles are generally housed in an opening in a mold plate between a manifold and a mold cavity. The mold plate is typically cold, particularly near the manifold and the mold cavity. As a result, a nozzle head portion, and the area around a nozzle tip, tend to lose more heat through direct contact with the mold than the nozzle mid-section, which does not contact any part of the mold plate. The uneven distribution of heat along the nozzle causes the temperature of the melt flowing through the nozzle to vary as it travels toward the mold cavity. Any variation in melt temperature can adversely affect the quality of the molded products and is therefore undesirable.

A further disadvantage of an uneven temperature distribution along the length of the nozzle is that the nozzle is subjected to high stress due to the continuous cycling between higher and lower temperatures. This can result in a shorter nozzle life.

With the increased use of plastic materials that are more sensitive to fluctuations in temperature, the melt must be maintained within more accurate and controllable temperature ranges. If the temperature rises too high, to compensate for the heat loss through the contact with the mold, degradation of the melt will result; and if the temperature drops too low, the melt will clog in the system and produce an unacceptable product. Both extremes can necessitate the injection molding apparatus being shut down for a clean-out, which can be a very costly procedure due to the loss of production time.

There is therefore a need to provide a hot runner nozzle having a generally uniform temperature distribution along the length thereof.

SUMMARY OF THE INVENTION

In accordance with one aspect of the present invention, there is provided an injection molding apparatus comprising a manifold, having a manifold channel and an outlet, and a nozzle coupled to the outlet of the manifold. The nozzle has a first nozzle body, a second nozzle body, and a thermal barrier disposed between the first nozzle body and the second nozzle body. The first nozzle body, second nozzle body and the thermal barrier typically define a melt channel through the nozzle. The first nozzle body is heated by a first heater and the second nozzle body is heated by a second heater. There is further provided a first means for connecting the thermal barrier to the first nozzle body, and a second means for connecting the second nozzle body to the thermal barrier. The thermal barrier may take the form of a sleeve, or may alternatively take the form of a cylindrical nozzle body segment. The thermal barrier may also include a flange extending outwardly between the first nozzle body and the second nozzle body. With such a configuration, the flange is typically sandwiched between the downstream end surface of the first nozzle body and the upstream end surface of the second nozzle body. The first means for connecting the thermal barrier to the first nozzle body may be by a threaded engagement. The second means for connecting the second nozzle body to the thermal barrier may be by a threaded engagement. In one embodiment, an air gap is provided between the first nozzle body and an upstream surface of the flange and/or between the second nozzle body and a downstream surface of the flange. In an alternative embodiment, the thermal barrier does not include the flange, and an air gap is provided between the downstream end surface of the first nozzle body and the upstream end surface of the second nozzle body. The thermal barrier is typically formed of a material that has a thermal conductivity less than the thermal conductivity of the first nozzle body and the thermal conductivity of the second nozzle body. In an embodiment, the thermal barrier is formed of either ceramic or titanium.

In accordance with another aspect of the present invention, the first means for connecting the thermal barrier to the first nozzle body may be by a threaded engagement, a press-fit engagement, a brazing engagement, or any other means known in the art. The second means for connecting the second nozzle body to the thermal barrier may be by a threaded engagement, a press-fit engagement, a brazing engagement, or any other means known in the art. The first nozzle body, the second nozzle body and the thermal barrier thus form modular components to the nozzle body, and can be assembled and disassembled with ease. The nozzle may further include a sleeve heater located over the first and the second nozzle bodies. Alternatively, the nozzle may include a partially embedded heater located on the outer surface of the first and second nozzle bodies. In another alternative embodiment, the nozzle may include a first heater in contact with the first nozzle body and a second heater in contact with the second nozzle body.

In accordance with yet another aspect of the present invention, there is provided a nozzle for use in an injection molding apparatus. The nozzle is comprised of a heated nozzle body, having a first nozzle body segment and a second nozzle body segment, and a thermal barrier coupled to the nozzle body and disposed between the first nozzle body segment and the second nozzle body segment. The nozzle includes a nozzle body melt passage which traverses through the nozzle body, wherein the nozzle body melt passage is defined by the inner surface of the first nozzle body segment, the inner surface of the thermal barrier, and the inner surface of the second nozzle body. The nozzle body segments are preferably formed of a thermally conductive material. The thermal barrier is preferably formed of a material that is less thermally conductive than the material which forms the nozzle body segments. The nozzle may further include a first heater thermally coupled to the first nozzle body segment and a second heater thermally coupled to the second nozzle body segment. The term "thermally coupled" is defined by a thermal link between the heater and the nozzle body segment. In other words, the heater is positioned with respect to the nozzle body segment such that the heater provides heat to the nozzle body segment. Alternatively, the nozzle may include a heat source which takes the form of a sleeve heater surrounding at least a portion of the nozzle body.

In accordance with still another aspect of the present invention, there is provided an injection molding apparatus comprising a manifold having a melt channel therethrough, a nozzle in fluid communication with the melt channel of the manifold, a heat source thermally coupled to the nozzle, and a mold component having a gate and a mold cavity adapted to receive melt from the nozzle through the gate. The nozzle is formed of a nozzle body, having a first nozzle body segment and a second nozzle body segment, and a thermal barrier, or insulating member, coupled to the nozzle body and separating the first nozzle body segment from the second nozzle body segment. The nozzle body is preferably formed of a thermally conductive material. The insulating member is preferably formed of a material that is less thermally conductive than the material which forms the nozzle body. The heat source may take the form of a sleeve heater or a coil heater embedded into the nozzle body. The heat source may alternatively include a first heater thermally coupled to the first nozzle body segment and a second heater thermally coupled to the second nozzle body segment.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
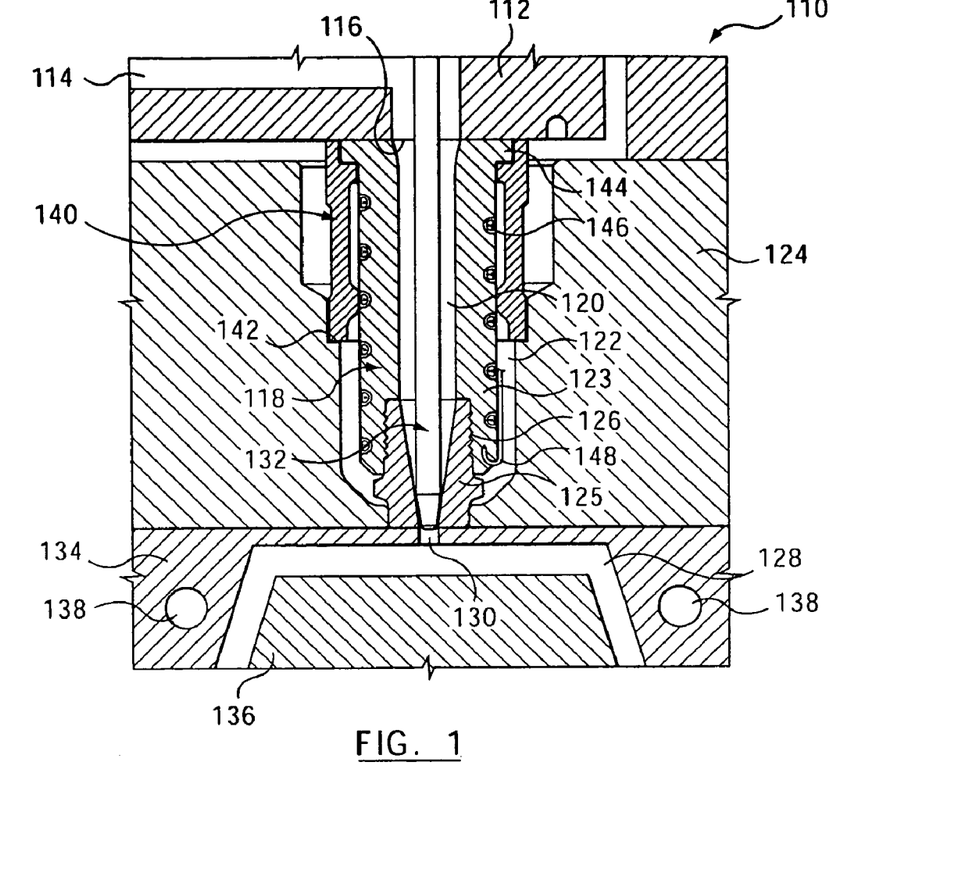
FIG. 1 is a side sectional view of a portion of an injection molding apparatus.

Referring now to FIG. 1, an example of an injection molding apparatus 110 is generally shown. The injection molding apparatus 110 includes a manifold 112 having a manifold melt channel 114. The manifold melt channel 114 extends from an inlet (not shown) to a manifold outlet 116. The manifold melt channel 114 receives melt from a machine nozzle (not shown) and delivers the melt to a hot runner nozzle 118, which is coupled to the manifold 112. Although only a single nozzle is shown, a typical injection molding apparatus includes a plurality of manifold outlets for delivering melt to a plurality of nozzles.

Nozzle 118 is received in an opening 122 in a mold plate 124. Nozzle 118 includes a nozzle body 123 and a nozzle tip 125. A collar 140 abuts a shoulder 142 of opening 122 and a shoulder 143 of the nozzle body 123 to maintain a head portion 144 of the nozzle body 123 in abutment with the manifold 112. The nozzle 118 is heated by a heater 146 and further includes a thermocouple 148. In this embodiment, the heater 146 is embedded in the outer surface of the nozzle body 123.

Nozzle tip 125 is received in a downstream end of nozzle body 123. The nozzle tip 125 is coupled to the nozzle body 123 by a threaded connection 126 and therefore may be easily removed for repair or replacement. A nozzle melt channel 120 extends through nozzle body 123 and nozzle tip 125. The nozzle melt channel 120 is in communication with the manifold outlet 116 and receives melt from the manifold channel 114.

A mold cavity 128 is provided between a cavity mold plate 134 and a mold core 136. The mold cavity 128 receives melt from the nozzle melt channel 120 through a mold gate 130. The mold gate 130 is selectively opened by a valve pin 132, which is movable into and out of engagement with the mold gate 130 by an actuator (not shown). Cooling channels 138 extend through the cavity mold plate 134 to cool the mold cavity 128.

Figure 2:
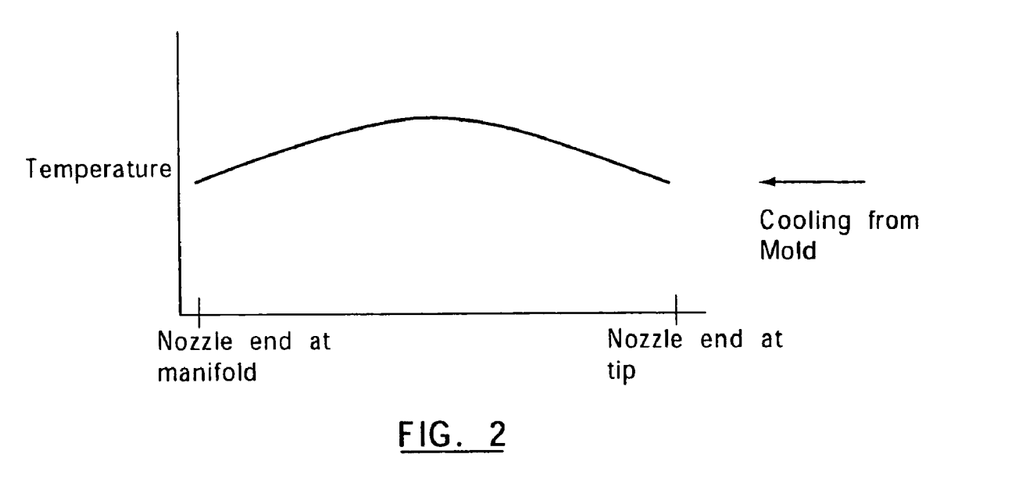
FIG. 2 is a graph depicting the heat distribution along a nozzle of the injection molding apparatus of FIG. 1.

FIG. 2 is a schematic graph depicting a typical temperature distribution for a nozzle such as the nozzle 118 of FIG. 1. As shown, the temperature at the nozzle head 144, which is adjacent to the manifold 112, and the nozzle tip 125, which is adjacent the mold cavity 128, is lower than the temperature at the mid-section of the nozzle 118. As discussed earlier, the nozzle 118 loses heat more quickly at the ends thereof due to contact with the manifold 112 and the cavity mold plate 134.

Figure 3A:
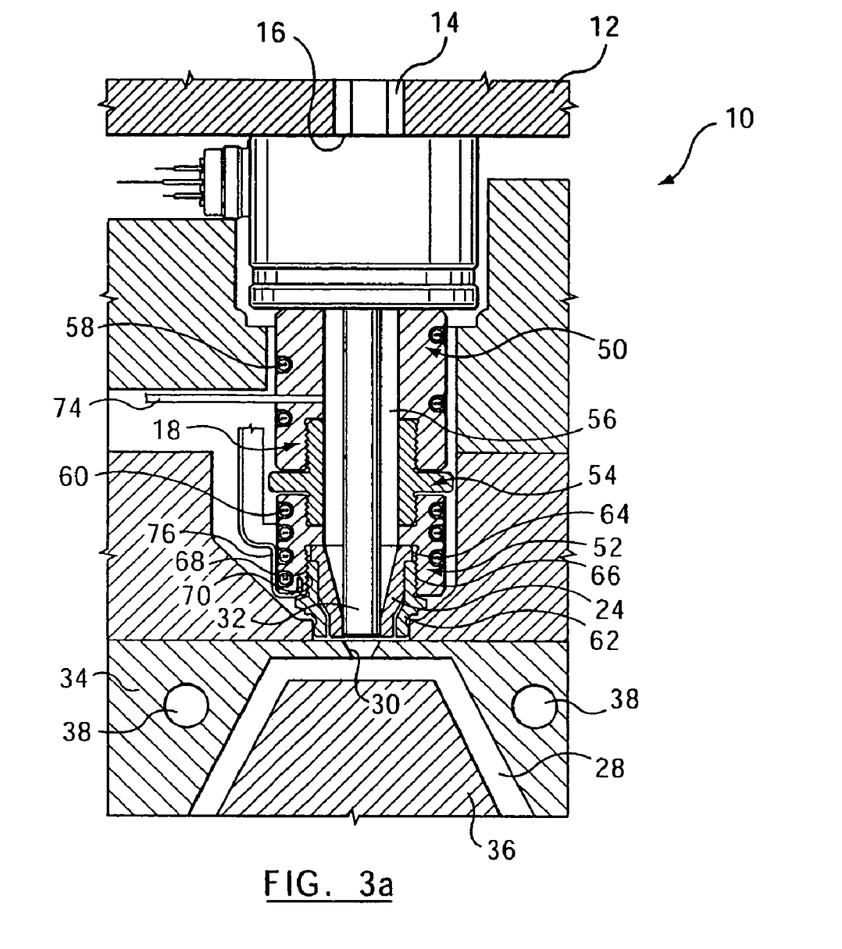
FIG. 3A is a side sectional view of a portion of an injection molding apparatus according to an embodiment of the present invention.

Referring to FIG. 3A, a portion of an injection molding apparatus 10 according to an embodiment of the present invention is shown. The injection molding apparatus 10 includes a manifold 12 having a manifold melt channel 14. The manifold melt channel 14 extends from an inlet (not shown) to a manifold outlet 16. The manifold melt channel 14 receives melt from a machine nozzle (not shown) and delivers the melt to a nozzle 18, which is coupled to the manifold 12. Although only a single nozzle is shown, a typical injection molding apparatus includes a plurality of manifold outlets for delivering melt to a plurality of nozzles.

A mold cavity 28 is provided between a cavity mold plate 34 and a mold core 36. The mold cavity 28 receives melt from the nozzle through a mold gate 30. The mold gate 30 is selectively opened by a valve pin 32, which is movable into and out of engagement with the mold gate 30 by an actuator (not shown). Cooling channels 38 extend through the cavity mold plate 34 to cool the mold cavity 28.

The nozzle 18 includes three modular components: a first nozzle body segment 50, a second nozzle body segment 52, and a thermal barrier 54 which forms an intermediate nozzle body segment between the first nozzle body segment 50 and the second nozzle body segment 52. The first nozzle body segment 50 is downstream of the manifold 12 and the second nozzle body segment 52 is downstream of the first nozzle body segment 50. The first nozzle body segment 50 and the second nozzle body segment 52 are removably coupled to one another by the thermal barrier, or insulating member, 54. Together, the first nozzle body segment 50, the second nozzle body segment 52 and the thermal barrier 54 define a melt channel 56, which allows melt to flow from the manifold channel 14 to the mold cavity 28. The first and second nozzle body segments 50, 52 are typically comprised of a tool steel (e.g., H13); however, they may alternatively be comprised of any tool steel or any other material typically used in the injection molding art, as would be apparent to one skilled in the relevant art. In addition, the materials of the first nozzle body segment 50 and the second nozzle body segment 52 may be different from one another.

A nozzle tip 24 is coupled to the second nozzle body segment 52 at a downstream end thereof by a transfer seal 62. An outwardly extending flange 64 of the nozzle tip 24 is sandwiched between an upstream surface 66 of the transfer seal 62 and the second nozzle body segment 52. The transfer seal 62 includes a threaded outer wall 68 that mates with a threaded inner wall 70 of the second nozzle body segment 52 to maintain the nozzle tip 24 and transfer seal 62 in position relative to the second nozzle body segment 52.

The first nozzle body segment 50 is heated by a first heater 58 and the second nozzle body segment 52 is heated by a second heater 60. The first and second heaters 58, 60 are operable independently to allow the temperature of the first and second nozzle body segments 50, 52 to be independently controlled. In the embodiment shown, first and second heaters 58, 60 are embedded in first and second nozzle body segments 50, 52, respectively. In alternative embodiments, first and second heaters may be thermally coupled to first and second nozzle body segments in any manner known to the art. The term "thermally coupled" is defined by a thermal link between the heater and the nozzle body segment. In other words, the heater is positioned with respect to the nozzle body segment such that the heater provides heat to the nozzle body segment. First and second thermocouples 74 and 76 are coupled to the first and second nozzle body segments 50 and 52, respectively, to provide temperature measurements therefor.

The heaters 58, 60 are provided to maintain the melt at a generally constant temperature as it travels through the nozzle 18. Typically, the second heater 60 is set at a higher temperature than first heater 58 in order to compensate for the heat loss from the second nozzle body segment 52 to the cold cavity mold plate 34. The thermal barrier 54 substantially limits heat transfer between the first nozzle body segment 50 and the second nozzle body segment 52; thereby allowing for more efficient and accurate temperature control of each individual nozzle body segment 50, 52.

Figure 3B:
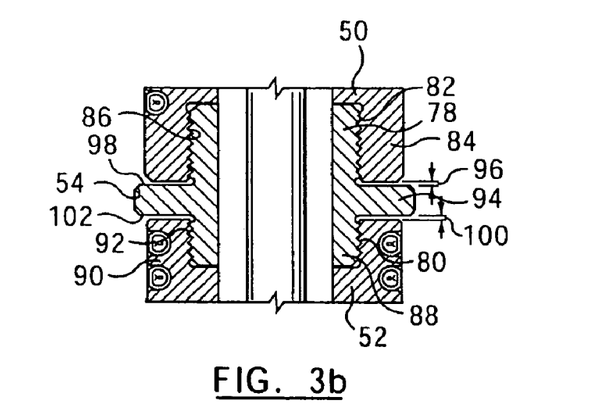
FIG. 3B is an enlarged view of a portion of FIG. 3A.

As shown in FIG. 3B, the thermal barrier 54 is generally a sleeve having a first end 78, a second end 80 and an outwardly extending flange 94 provided therebetween. The first end 78 is received in a recess 82 that is provided in a downstream end 84 of the first nozzle body segment 50. The recess 82 includes an inner wall 86 that is threaded to mate with the first end 78 of the thermal barrier 54, which is also threaded. Similarly, the second end 80 of the thermal barrier 54 is received in a recess 88, which is provided in an upstream end 90 of the second nozzle body segment 52 and includes a threaded inner wall 92 for mating with threads provided on the second end 80 of the thermal barrier 54. Although this embodiment shows the thermal barrier 54 connected to first nozzle body segment 50 and second nozzle body segment 52 by a threaded engagement, thermal barrier 54 could also be connected to first and second nozzle body segments 50, 52 by a press-fit arrangement, or by brazing or welding or fused together by other means as would be apparent to one skilled in the relevant art. The threaded engagement, however, provides an added thermal barrier due to the air gaps between the engaging threads of the thermal barrier and the first and second nozzle body segments.

The outwardly extending flange 94 is sized to extend radially to at least an outer diameter of the first and second nozzle body segments 50, 52. As such, the thermal barrier 54 completely separates the first nozzle body segment 50 from the second nozzle body segment 52. Typically, the nozzle body segments will have equal outer diameters. In the case of two nozzle body segments with different sized outer diameters, however, outwardly extending flange 94 is sized to extend radially to at least an outer diameter of the larger of the first and second nozzle body segments 50, 52.

A first air gap 96 is provided between an upstream surface 98 of the outwardly extending flange 94 and the first nozzle body segment 50. Similarly, a second air gap 100 is provided between a downstream surface 102 of the outwardly extending flange 94 and the second nozzle body segment 52. In another embodiment, the first and second air gaps 96, 100 are eliminated and the upstream and downstream surfaces of the thermal barrier 54 contact the first and second nozzle body segments 50, 52, respectively. The air gaps 96, 100 provide additional insulation between the first and second nozzle body segments 50, 52; however, the thermal barrier 54 alone provides sufficient insulation to limit heat from transferring between the first nozzle body segment 50 and the second nozzle body segment 52.

The thermal barrier 54 is comprised of a material that is less thermally conductive than the material of the first nozzle body segment 50 and second nozzle body segment 52. Suitable materials include titanium and ceramic, for example. Because it acts as an insulator, the thermal barrier 54 substantially limits heat transfer between the first nozzle body segment 50 and the second nozzle body segment 52.

In operation, melt is injected from the machine nozzle into the manifold channel 14. The manifold channel 14 distributes the melt to a plurality of nozzle melt channels, including melt channel 56 of nozzle 18. Melt is injected from the melt channel 56 into the mold cavity 28 through mold gate 30. The melt in the mold cavity 28 is then cooled and the mold cavity 28 is opened to release the molded parts.

Figure 4:
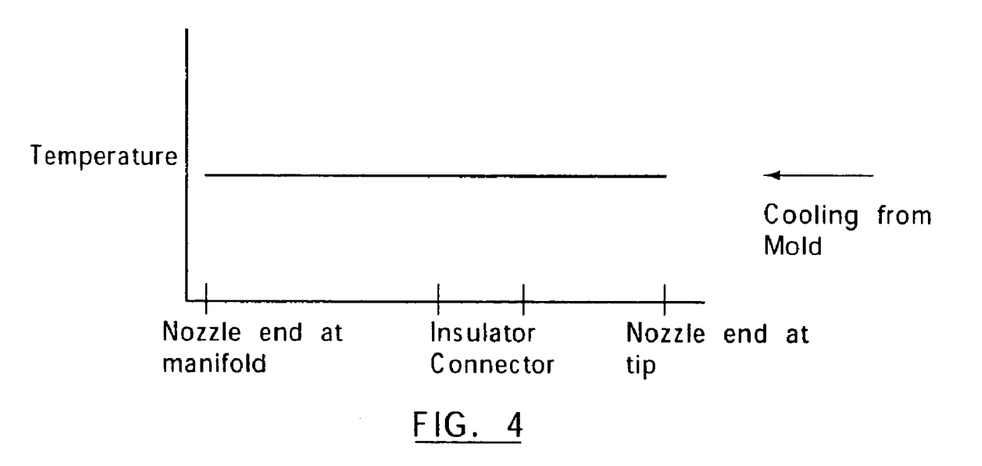
FIG. 4 is a graph depicting the heat distribution along a nozzle of the injection molding apparatus of FIG. 3A.

During the injection process, the melt is maintained at a generally uniform temperature by first and second heaters 58, 60 as it travels through the first nozzle body segment 50, the thermal barrier 54 and the second nozzle body segment 52. A schematic graph of the temperature distribution is generally shown in FIG. 4. As shown, the addition of thermal barrier 54 causes the heat distribution to be more uniform along the length of the nozzle 18.

It will be appreciated by a person skilled in the art that although the hot runner nozzle 18 is shown as being valve-gated, it may alternatively be thermal-gated. Further, a torpedo tip may be used in place of the nozzle tip shown in FIG. 3A.

Figure 5:
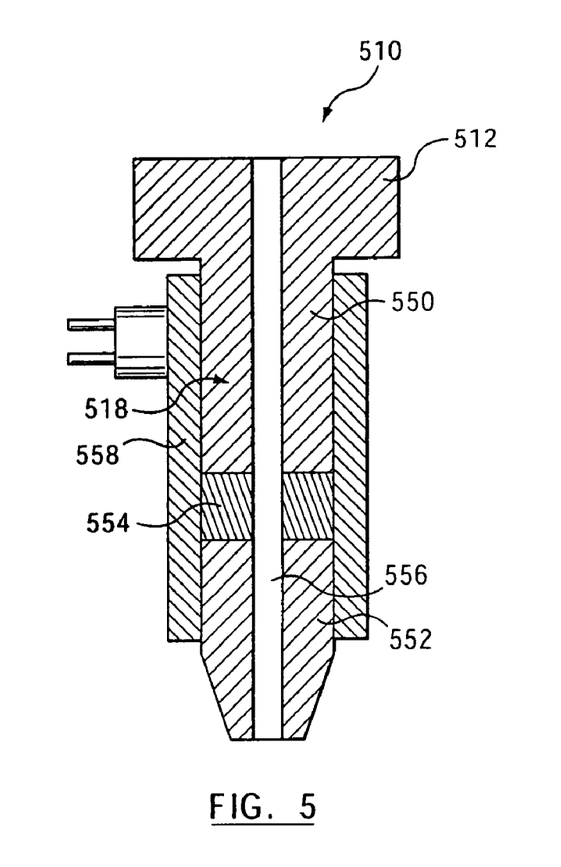
FIG. 5 is a side sectional view of a portion of an injection molding apparatus according to an alternative embodiment of the present invention.

FIG. 5 is a side sectional view of a portion of an injection molding apparatus 510 according to an alternative embodiment of the present invention. Injection molding apparatus 510 includes a manifold 512 and a nozzle 518. The nozzle 518 includes three modular components: a first nozzle body segment 550, a second nozzle body segment 552, and a thermal barrier 554 which forms an intermediate nozzle body segment between the first nozzle body segment 550 and the second nozzle body segment 552. As shown, the first nozzle body segment 550 and second nozzle body segment 552 are removably coupled to the thermal barrier 554, which lies between the nozzle bodies. Together, the first nozzle body segment 550, the second nozzle body segment 552 and the thermal barrier 554 define a melt channel 556. The first and second nozzle body segments 550, 552 are typically comprised of a tool steel (e.g., H13); however, they may alternatively be comprised of any tool steel or any other thermally conductive material typically used in the injection molding art. In addition, the materials of the first nozzle body segment 550 and the second nozzle body segment 552 may be different from one another.

The nozzle 518 is heated by a sleeve heater 558. The sleeve heater 558 is disposed about the outer surface of the nozzle 518 to thereby maintain the melt at a generally constant temperature as it travels through the melt channel 556.

Because it acts as an insulator, the thermal barrier 554 substantially limits heat transfer between the first nozzle body segment 550 and the second nozzle body segment 552; thereby allowing for more efficient and accurate temperature control of each individual nozzle body segments 550, 552. The thermal barrier 554 is comprised of a material that is less thermally conductive than the material of the first and second nozzle body segments 550, 552. Suitable materials include titanium and ceramic, for example.

Figure 6:
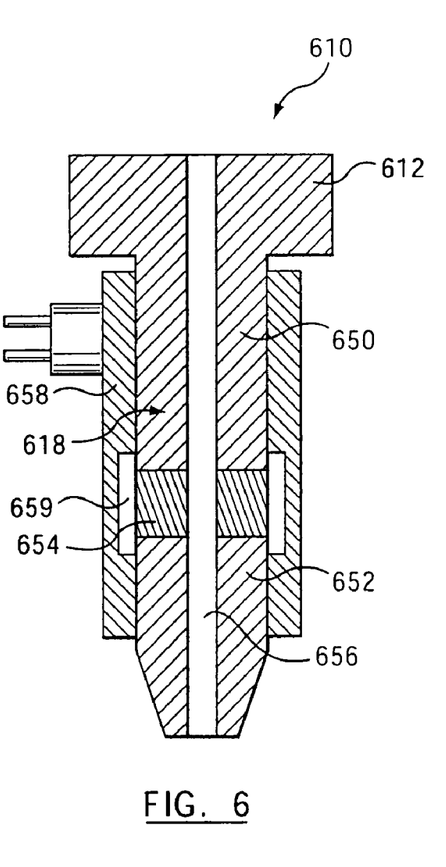
FIG. 6 is a side sectional view of a portion of an injection molding apparatus according to another embodiment of the present invention.

FIG. 6 is a side sectional view of a portion of an injection molding apparatus 610 according to another embodiment of the present invention. Injection molding apparatus 610 includes a manifold 612 and a nozzle 618. The nozzle 618 includes three modular components: a first nozzle body segment 650, a second nozzle body segment 652, and a thermal barrier 654 which forms an intermediate nozzle body segment between the first nozzle body segment 650 and the second nozzle body segment 652. As shown in FIG. 6, the first nozzle body segment 650 and second nozzle body segment 652 are removably coupled to the thermal barrier 654 that lies between the nozzle body segments. Together, the first nozzle body segment 650, the second nozzle body segment 652 and the thermal barrier 654 define a melt channel 656. The first and second nozzle body segments 650, 652 are typically comprised of a tool steel (e.g., H13); however, they may alternatively be comprised of any tool steel or any other thermally conductive material typically used in the injection molding art. In addition, the materials of the first nozzle body segment 650 and the second nozzle body segment 652 may be different from one another. As discussed in the previous embodiments, the thermal barrier 654 is comprised of a material that is less thermally conductive than the material of the first and second nozzle body segments 650, 652. Suitable materials include titanium and ceramic, for example.

The nozzle 618 is heated by a sleeve heater 658. The sleeve heater 658 is disposed about the outer surface of the nozzle 618 to thereby maintain the melt at a generally constant temperature as it travels through the melt channel 656. The sleeve heater 658 includes a cut-out 659 which produces a gap between the sleeve heater 658 and the nozzle 618. The length of the cut-out 659 corresponds approximately to the length and location of the thermal barrier 654, such that the sleeve heater 658 does not come in contact with the thermal barrier 654. The cut-out 659 may be used in order to better control the temperature gradient along the nozzle 618.

Figure 7:
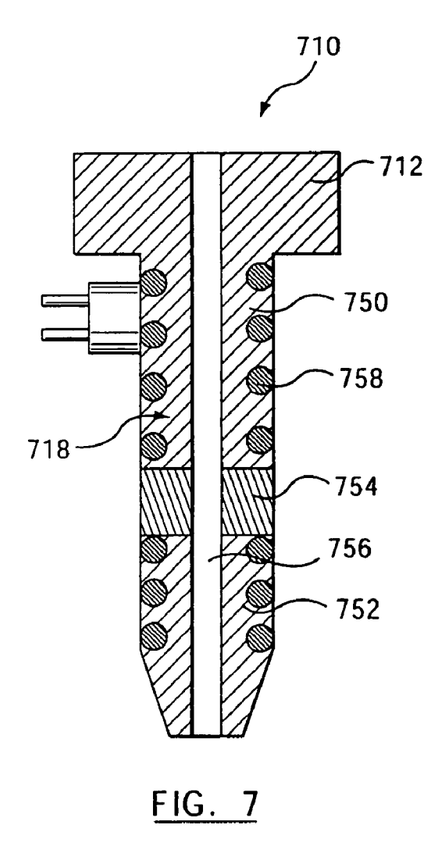
FIG. 7 is a side sectional view of a portion of an injection molding apparatus according to yet another embodiment of the present invention.

FIG. 7 is a side sectional view of a portion of an injection molding apparatus 710 according to yet another embodiment of the present invention. Injection molding apparatus 710 includes a manifold 712 and a nozzle 718. The nozzle 718 includes three modular components: a first nozzle body segment 750, a second nozzle body segment 752, and a thermal barrier 754 which forms an intermediate nozzle body segment between the first nozzle body segment 750 and the second nozzle body segment 752. The first nozzle body segment 750 and second nozzle body segment 752 are removably coupled to the thermal barrier 754, which lies between the nozzle bodies. Together, the first nozzle body segment 750, the second nozzle body segment 752, and the thermal barrier 754 define a melt channel 756. The first and second nozzle body segments 750, 752 are typically comprised of a tool steel (e.g., H13); however, they may alternatively be comprised of any tool steel or any other thermally conductive material typically used in the injection molding art. In addition, the materials of the first nozzle body segment 750 and the second nozzle body segment 752 may be different from one another. As discussed in previous embodiments, the thermal barrier 754 is comprised of a material that is less thermally conductive than the material of the first and second nozzle body segments 750, 752. Suitable materials include titanium and ceramic, for example.

The nozzle 718 is heated by a heater 758. The heater 758 takes the form of a thermal coil embedded in the outer surface of the nozzle 718 to thereby maintain the melt at a generally constant temperature as it travels through the melt channel 756. The thermal coil of the heater 758 is wound around the nozzle 718 at varying pitch, so that the heater spiral has a tighter pitch at the ends of the nozzle 718, and a wider pitch about the area of the nozzle 718 comprising the thermal barrier 754.

Figure 8:
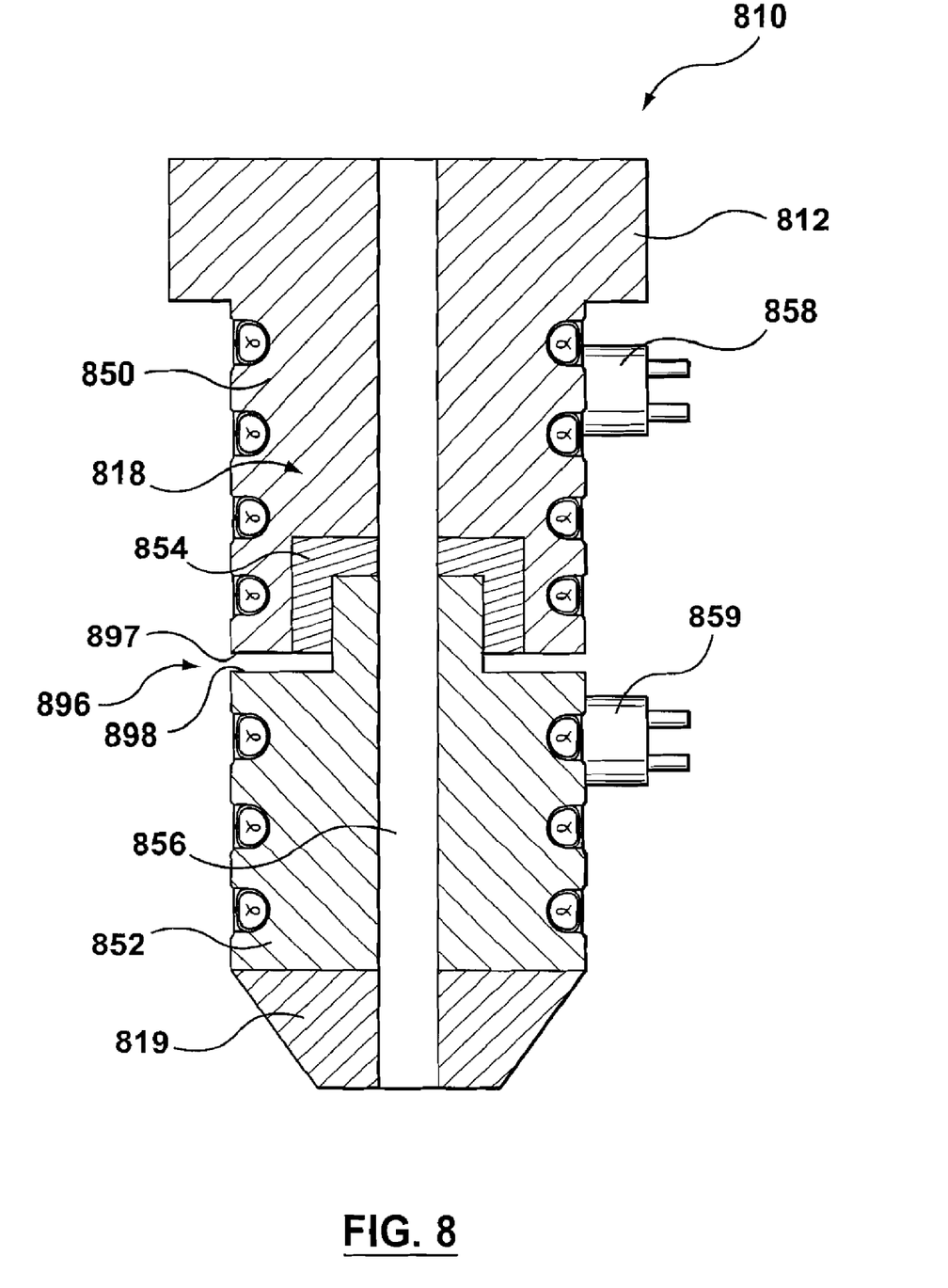
FIG. 8 is a side sectional view of a portion of an injection molding apparatus according to another embodiment of the present invention.

FIG. 8 shows a side sectional view of a portion of an injection molding apparatus 810 according to another embodiment of the present invention. The injection molding apparatus 810 includes a manifold 812, a nozzle 818, and a nozzle tip 819. The nozzle 818 includes three modular components: a first nozzle body segment 850, a second nozzle body segment 852, and a thermal barrier 854 which forms an intermediate nozzle body segment between the first and second nozzle body segments 850, 852. The thermal barrier 854 is preferably coupled to the first nozzle body segment 850 through a threaded engagement. The thermal barrier 854, however, may be coupled to the first nozzle body segment by alternative means such as press-fitting, brazing, or any other means known to the art. The second nozzle body segment 852 is preferably coupled to the thermal barrier 854 through a threaded engagement. The second nozzle body segment 852, however, may be coupled to the thermal barrier 854 by alternative means such as press-fitting, brazing, or any other means known to the art. Threaded engagements are preferable because they allow the modular components to be assembled and disassembled with the greatest ease.

In the embodiment shown in FIG. 8, an air gap 896 is provided between the downstream end surface 897 of the first nozzle body segment 850 and the upstream end surface 898 of the second nozzle body segment 852. The air gap 896 acts to further insulate the first nozzle body segment 850 from the second nozzle body segment 852.

The injection molding apparatus 810 further includes a nozzle tip 819 to direct melt into a mold cavity gate (not shown). Together, the first nozzle body segment 850, the thermal barrier, or intermediate nozzle body segment, 854, the second nozzle body segment 852, and the nozzle tip 819 define a melt channel 856. The melt channel 856 is in fluid communication with a manifold melt channel (not shown) upstream of the nozzle 818 and a mold cavity gate (not shown) downstream of the nozzle 818.

The first and second nozzle body segments 850, 852 are typically comprised of tool steel (e.g., H13); however, they may alternatively be comprised of any tool steel or any other thermally conductive material typically used in the injection molding art. In addition, the materials of the first nozzle body segment 850 and the second nozzle body segment 852 may be different from one another. As discussed in previous embodiments, the thermal barrier 854 is comprised of a material that is less thermally conductive than the material of the first and second nozzle body segments 850, 852. Suitable materials include titanium and ceramic, for example.

As shown, the first nozzle body segment 850 is heated by a heater 858, and the second nozzle body segment 852 is heated by a heater 859. The heaters 858, 859 are typically thermal coils embedded in the outer surface of the nozzle body segments 850, 852 to thereby maintain the melt at a generally constant temperature as it travels through the melt channel 856.

It shall be understood that the nozzles shown in FIGS. 5-8 include a nozzle tip at a downstream end thereof. Such a nozzle tip may be configured as is known in the art. For example, a nozzle tip may be held within the respective second nozzle body segment by a transfer seal, as shown in FIG. 3a and described above.

The many features and advantages of the invention are apparent from the detailed specification. It is intended by the appended claims to cover all features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents are intended to be covered by the claims.

What is claimed is:

1. An injection molding apparatus comprising:
    a manifold having a heater and a manifold channel for distributing melt from a manifold inlet to a plurality of manifold outlets;
    a nozzle having a nozzle melt channel, the nozzle coupled to the manifold for receiving the melt from a manifold outlet, wherein the nozzle includes,
        a first nozzle body segment forming a portion of the nozzle melt channel,
        a second nozzle body segment forming a portion of the nozzle melt channel, and
        a thermal barrier segment coupled to and located between the first nozzle body segment and second nozzle body segment, the thermal barrier segment forming a portion of the nozzle melt channel and the thermal barrier being made from a material having a thermal conductivity which is lower than the thermal conductivity of the material of at least one of the first nozzle body segment and the second nozzle body segment; and
    a nozzle tip coupled to the downstream end of the second nozzle segment, the nozzle tip for receiving melt from the nozzle melt channel and delivering the melt to a mold cavity.

2. The injection molding apparatus of claim 1, wherein the material of the thermal barrier segment is less conductive than the material of both the first nozzle body segment and second nozzle body segment.

3. The injection molding apparatus of claim 2, wherein the first and second nozzle body segments are made of the same material.

4. The injection molding apparatus of claim 3, wherein the first and second nozzle body segments are made of steel.

5. The injection molding apparatus of claim 4, wherein the thermal barrier segment is made of one of titanium or ceramic.

6. The injection molding apparatus of claim 1, wherein the thermal barrier segment is made of one of titanium or ceramic.

7. The injection molding apparatus of claim 1, further comprising a heater coupled to the first and second nozzle body segments.

8. The injection molding apparatus of claim 1, further comprising a first heater coupled to the first nozzle body segment and a second heater coupled to the second nozzle body segment.

9. The injection molding apparatus of claim 8, further comprising a first thermocouple coupled to the first nozzle body segment and a second thermocouple coupled to the second nozzle body segment.

10. The injection molding apparatus of claim 9, wherein the first heater and the second heater are independently controllable.

11. The injection molding apparatus of claim 1, wherein an upstream end of the thermal barrier segment is directly connected to a downstream end of the first nozzle body segment, and a downstream end of the thermal barrier segment is directly connected to an upstream end of the second nozzle body segment.

12. The injection molding apparatus of claim 11, wherein the thermal barrier segment is connected to the first and second nozzle body segments by threads.

13. The injection molding apparatus of claim 11, wherein the thermal barrier segment is connected to the first and second nozzle body segments by welding or brazing.

14. The injection molding apparatus of claim 11, wherein the thermal barrier segment is connected to the first and second nozzle body segments by press fit.

15. The injection molding apparatus of claim 1, wherein the thermal barrier segment is coupled to the first and second nozzle body segments by threads.

16. The injection molding apparatus of claim 1, wherein the thermal barrier segment is coupled to the first and second nozzle body segments by welding or brazing.

17. The injection molding apparatus of claim 1, wherein the thermal barrier segment is coupled to the first and second nozzle body segments by press fit.

18. The injection molding apparatus of claim 1, wherein the thermal barrier completely separates the first nozzle body segment from the second nozzle body segment.

19. The injection molding apparatus of claim 1, further comprising a first air gap between the first nozzle body segment and the thermal barrier and a second air gap between the second nozzle body segment and the thermal barrier.

20. An injection molding apparatus comprising:
    a manifold having a heater and a manifold melt channel for distributing melt from a manifold inlet to a plurality of manifold outlets;
    a nozzle having a nozzle melt channel, the nozzle being coupled to the manifold for receiving the melt from a manifold outlet, the nozzle including,
        a first nozzle body segment forming a portion of the nozzle melt channel,
        a second nozzle body segment forming a portion of the nozzle melt channel,
        a thermal barrier segment forming a portion of the nozzle melt channel and disposed between the first and second nozzle body segments such that the first nozzle body segment, the second nozzle body segment, and the thermal barrier segment are coupled together along a common axis and the first and second nozzle body segments are completely separated from each other, wherein the thermal barrier segment is made from a material having a lower thermal conductivity than the material of at least one of the first nozzle body segment and the second nozzle body segment, and
        a heater couple to the first and second nozzle body segments; and
    a nozzle tip coupled to a downstream end of the second nozzle body segment, the nozzle tip for receiving the melt from the nozzle melt channel and delivering the melt to a mold cavity.

21. The injection molding apparatus of claim 20, wherein the material of the thermal barrier segment is less conductive than the material of both the first nozzle body segment and second nozzle body segment.

22. The injection molding apparatus of claim 21, wherein the first and second nozzle body segments are made of the same material.

23. The injection molding apparatus of claim 22, wherein the first and second nozzle body segments are made of steel.

24. The injection molding apparatus of claim 22, wherein the thermal barrier segment is made of one of titanium or ceramic.

25. The injection molding apparatus of claim 20, wherein the thermal barrier segment is made of one of titanium or ceramic.

26. The injection molding apparatus of claim 20, wherein the nozzle heater comprises a first heater coupled to the first nozzle body segment and a second heater coupled to the second nozzle body segment.

27. The injection molding apparatus of claim 26, further comprising a first thermocouple coupled to the first nozzle body segment and a second thermocouple coupled to the second nozzle body segment.

28. The injection molding apparatus of claim 27, wherein the first heater and the second heater are independently controllable.

29. The injection molding apparatus of claim 20, wherein an upstream end of the thermal barrier segment is directly connected to a downstream end of the first nozzle body segment, and a downstream end of the thermal barrier segment is directly connected to an upstream end of the second nozzle body segment.

30. The injection molding apparatus of claim 29, wherein the thermal barrier segment is connected to the first and second nozzle body segments by threads.

31. The injection molding apparatus of claim 29, wherein the thermal barrier segment is connected to the first and second nozzle body segments by welding or brazing.

32. The injection molding apparatus of claim 29, wherein the thermal barrier segment is connected to the first and second nozzle body segments by press fit.

33. The injection molding apparatus of claim 20, wherein the thermal barrier segment is coupled to the first and second nozzle body segments by threads.

34. The injection molding apparatus of claim 20, wherein the thermal barrier segment is coupled to the first and second nozzle body segments by welding or brazing.

35. The injection molding apparatus of claim 20, wherein the thermal barrier segment is coupled to the first and second nozzle body segments by press fit.

36. The injection molding apparatus of claim 20, further comprising a first air gap between the first nozzle body segment and the thermal barrier and a second air gap between the second nozzle body segment and the thermal barrier.

37. An injection molding apparatus comprising:
a manifold having a heater and a manifold melt channel for distributing melt from a manifold inlet to a plurality of manifold outlets;
a nozzle having a nozzle melt channel, the nozzle being coupled to the manifold for receiving the melt from a manifold outlet, the nozzle including,
a first nozzle body segment forming a portion of the nozzle melt channel,
a second nozzle body segment forming a portion of the nozzle melt channel,
a thermal barrier segment forming a portion of the nozzle melt channel, the thermal barrier segment being disposed between and coupled to the first and second nozzle body segments such that the thermal barrier substantially limits heat transfer between the first nozzle body segment and the second nozzle body segment, and
a heater coupled to the first and second nozzle body segments; and
a nozzle tip coupled to a downstream end of the second nozzle body segment, the nozzle tip for receiving the melt from the nozzle melt channel and delivering the melt to a mold cavity.

38. The injection molding apparatus of claim 37, wherein the thermal barrier segment is formed from a material having a lower thermal conductivity than the material of at least one of the first and second nozzle body segments.

39. The injection molding apparatus of claim 37, wherein the thermal barrier segment is formed from a material having a lower thermal conductivity than the material of the first nozzle body segment and the material of the second nozzle body segment.

40. The injection molding apparatus of claim 39, wherein the first and second nozzle body segments are made of the same material.

41. The injection molding apparatus of claim 39, wherein the first and second nozzle body segments are made of steel.

42. The injection molding apparatus of claim 41, wherein the thermal barrier segment is made of one of titanium or ceramic.

43. The injection molding apparatus of claim 37, wherein the thermal barrier segment is made of one of titanium or ceramic.

* * * * *